April 28, 1959     W. W. BALDWIN     2,884,091
FILTERS

Filed May 6, 1957                              2 Sheets-Sheet 1

INVENTOR.
WILLIAM W. BALDWIN
BY

April 28, 1959   W. W. BALDWIN   2,884,091
FILTERS
Filed May 6, 1957
2 Sheets-Sheet 2

United States Patent Office 2,884,091
Patented Apr. 28, 1959

2,884,091

FILTERS

William W. Baldwin, Fayetteville, N.Y., assignor to Cambridge Filter Manufacturing Corporation, Syracuse, N.Y., a corporation of New York Application May 6, 1957, Serial No. 657,205

5 Claims. (Cl. 183—71)

This invention relates to space filters and more particularly to high efficiency filters of the pleated extended filter surface type.

In filters of the type referred to it has been the practice to construct a filter core of pleated filter material separated by corrugated spacers extending into the pleats from opposite sides of the filter to provide air passages to the extended filtering surfaces. It has been the practice to mount a core composed of a plurality of pleats of such sheet filter material within a rectangular frame, and to seal the core within the frame through the use of plastic sealing material, of a rubber base adhesive type. Such plastic material is incapable of withstanding high temperatures, is subject to attack by corrosive vapors in the gases being filtered, and on softening when exposed to high temperatures, is likely to develop bypasses around the filter core, rendering the same unsatisfactory where perfection is a requisite. The use of ceramic cements has been attempted, but cracks develop from heat and dryness, again resulting in unsatisfactory results.

The present invention is directed to the mechanical mounting of a filter core within a filter frame through the use of a compressed glass fiber mat, wherein the mat is composed of extremely fine glass or asbestos or other fibers of approximately one micron size or smaller in cross section, and is compacted between a rigid surrounding frame upon a filter core in such a manner as to mechanically and frictionally hold a core rigidly in the frame while the compacted mat extends into the cracks and crannies to effectively seal the mounting of the core within the frame against bypassing. The frame is rigid and the core of a rectangular shape so that the degree of compression imposed upon the compacted mat, and in turn upon the irregular side faces of the core are uniform but not so great as to endanger crushing of the core structure, although the pressure as applied through the mat is uniform and sufficient to compact the mat to about a fourth of its usual volume. The uniformity of pressure is in part due to the rigidity of the surrounding frame, and by rigidity is meant the ability of the flat sides of the frame to withstand bowing.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1:
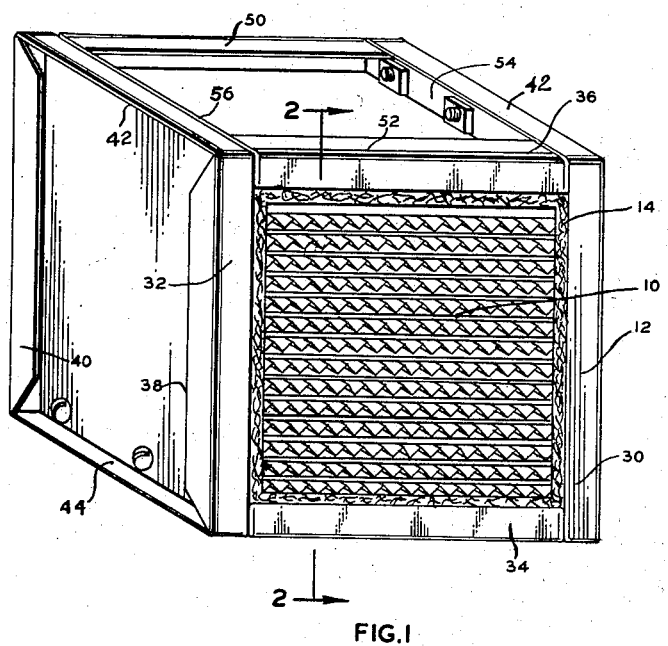
Figure 1 is a perspective view of a filter unit embodying the invention.

The filter unit comprises a core 10, a rigid frame 12 and a compressed mat seal 14 extending around the core and compacted against the core at all points by the rigid panels forming the surrounding frame. The core comprises a plurality of thin corrugated sheet metal foil or mineral fiber sheet spacing members 16 disposed between folds or pleats of a continuous sheet of filter medium 18, such sheet filter medium being, if desired, in the form of sheet filter paper of the type referred to in Stafford and Lee Patent No. 2,507,827, granted May 16, 1950, or it may be a thin filter sheet formed of fiber glass, the fibers of which, for example, are in the order of one micron. Each spacer has an end 20 over which is disposed a fold of the filter sheet 18, the fold covering the corrugation ends. The spacer at its other end 22 is exposed for entrance of air into the filter or the exhaust of air that has been filtered. Alternate corrugated spacers have their exposed ends 22 on the inlet air side of the filter and the remaining spacers have their exposed ends 22 on the exhaust side of the filter. The construction of the core may be in accordance with Root Patent #2,720,937, granted Oct. 18, 1955.

Figure 2:
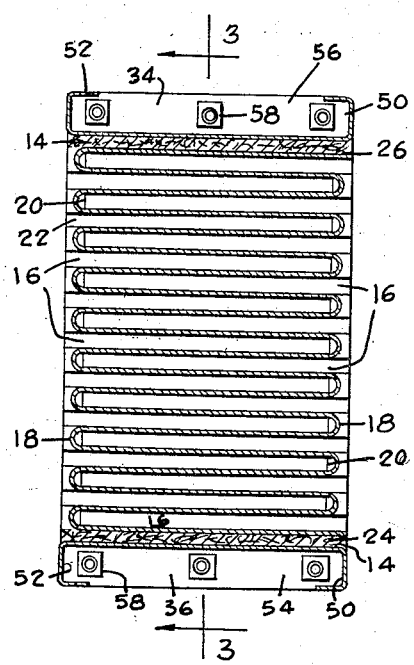
Figure 2 is a sectional view taken substantially on the plane 2—2 of Figure 1.
Figure 3:
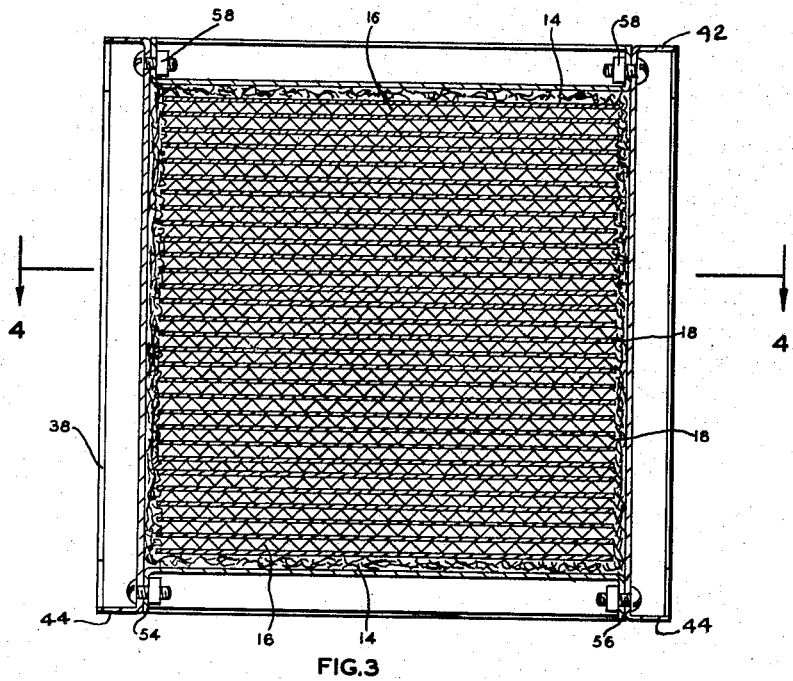
Figure 3 is a sectional view taken substantially on the line 3—3 of Figure 2.
Figure 4:
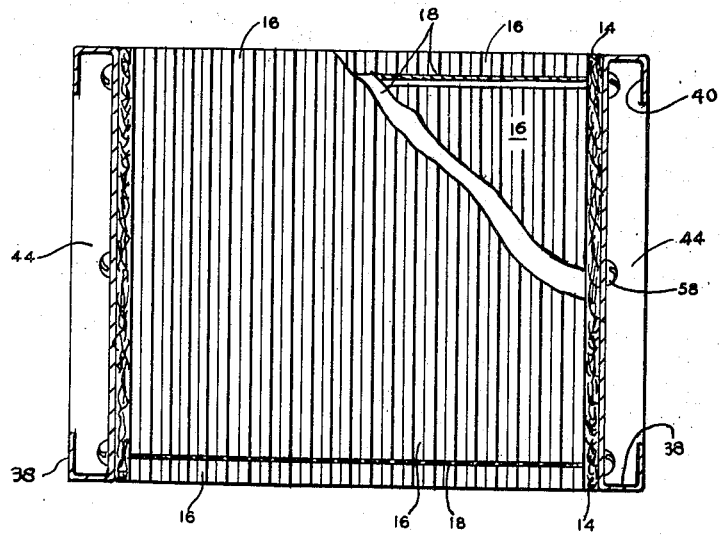
Figure 4 is a sectional view with parts broken away taken substantially on the line 4—4 of Figure 3.

The core is made up of a plurality of such spacers with a sheet of filter material pleated or folded in the manner indicated, for example, as in Figure 2. One end of such sheet filter material is indicated at 24 and extends along the corrugated face of the first spacer 16, and thereafter interloops with the alternately disposed spacers in the manner described. The other end of the sheet of filter material is disposed as at 26 along the corrugated face of the last spacer. The folds and spacers provide a rectangular core having a high filter capacity and low back pressure for a given core cross section, by reason of the extended area of the filter sheet exposed to the air stream.

When a core is thus built up, it is essential that the core be mounted within a supporting frame in such manner as to positively prevent bypassing or leakage of aerosols, around the filter. It will be appreciated that gas containing particulate matter, if permitted to freely bypass the filter unit, would tend to destroy the effectiveness of the filter. It has been the practice, as hereinabove referred to, to mount a filter core of the type described within a frame through the use of plastic, rubber base adhesive sealing compositions. Such sealing compositions melt at low temperatures and therefore limit the use of such a filter to low temperatures. Since the spacers 16 are of metal or other noncombustible material and the sheet filter material may be of mineral fibers, such as glass fibers or asbestos fibers, the core itself is capable of withstanding high temperatures.

In order to form an effective mounting for such a filter core which will seal the core within the frame and prevent bypassing without benefit of filtration, and which may withstand high temperature gases, a rigid frame of rectangular shape is assembled in spaced relation about the core. Before assembly, a wrap in the form of a fiber glass blanket or mat composed of extremely fine glass fibers of approximately one micron diameter is applied around the core. The mat is compressed in thickness to approximately one fourth of its original thickness of about an inch against the core by the surrounding frame in the assembly thereof.

In order to protect the core from being crushed by reason of the frame pressure imposed upon the surrounding mat, and in order to assure that the pressure or compression will be uniform on substantially all sides of the core, and that such pressure will be sufficient to effectively seal the core in the frame, the frame is formed of rigid sheet metal members capable of resisting bowing or bending or yielding to the pressure of the mat. In practice, such frame may be composed of a pair of like top and bottom members 34 and 36 and a pair of like side members 30 and 32. The top members are formed from heavy gauge sheet metal and the forward and rearward edges thereof are formed to provide channel section flanges 50 and 52 which rigidify the frame member. The side edges of the top and bottom members are also flanged as at 54 and 56 to further rigidify the top and bottom members.

The side members 30 and 32 are provided with channel flanges 38 and 40 along their forward and rearward edges, and their top and bottom edges are flanged as at 42 and 44 to stiffen the side panels and also to provide flanges for joining to the top and bottom members as by bolts as indicated at 58. It will be seen that the frame members as thus formed are rigid, and when secured together, form a rigid rectangular casing, defining rigid marginal rectangular frames at each end, which casing and frames are relatively unyielding, and adapted to place a uniform compression upon the fiber glass mat wrapped around the core throughout the length of its wrap so that the fibers of the glass mat are compacted and forced under fairly uniform pressure into each and every nook and fissure so as to effectively seal the core within the frame and prevent bypass. It will be appreciated that the surfaces of the core facing the frame are of irregular configuration and that the mat as thus compacted yields to the configuration and forms adequate and effective contact with the irregular surface to prevent unfiltered bypass.

The glass mat in practice may be of a width substantially equal to the depth of the filter core, and with such length, assurance is had against the remotest possibility of unfiltered bypass. The uniform compression of the glass mat mechanically upon the core by the surrounding frame in the manner set forth provides a sufficiently rigid mount for the core within the frame so that the core is rigidly held within the frame as securely as though adhesives and the like had been used. Merely the pressure of the frame acting through the mat, and the frictional contact of the mat on the core top and bottom and side walls is sufficient to provide a rigid mount. Such a filter unit, being free of organic materials, is capable of handling gases of such high temperatures as would ordinarily melt the adhesive and plastic compositions heretofore used for mounting and sealing the core in a frame.

The channel flanges of the surrounding casing, which extend completely around the front and the back of the filter maintain uniform pressure upon the core and serve to rigidify the flat panel portions of the frame members lying midway between the front channel flanges and the back channel flanges.

The construction as shown completely eliminates the necessity for use of adhesives and the like, and the resulting construction is of such a mechanical nature that the core is securely bound in place by the very nature of the surrounding mat and its frictional engagement within the frame and against the core. While the corrugated separators are shown disposed in horizontal planes, the filter may be mounted with such separators disposed in vertical planes, or the filter may be disposed to filter a vertical stream of air.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A filter for gases and the like comprising a rectangular core composed of a sheet of pleated filter material, and corrugated spacers interposed in the loops of said pleats, a rigid rectangular casing surrounding said core and disposed in substantially uniform spaced relation from said core, and a mat of compacted mineral fiber filter material composed of fibers in the order of one micron disposed in the perimetral region around the core and within the casing, said mat being held compacted directly against the flanks of the core including the spacers thereof and being compacted to a volume about one fourth of its normal uncompacted volume, said casing comprising frame members secured together and forming a rectangular casing adapted to be assembled about said core and mat, and said frame members each having forward and rearward rigidifying flanges forming rigid rectangular frames along the front and rear marginal edges of said casing, whereby to apply uniform compacting pressure upon said mat overlying the flanks of said core.

2. A filter for gases and the like comprising a rectangular core composed of a sheet of pleated filter material comprising mineral fibers of the order of one micron, and corrugated spacers interposed in the loops of said pleats, a rigid rectangular noncombustible casing surrounding said core and disposed in substantially uniform spaced relation around said core, and a mat of compacted mineral fiber filter material composed of fibers in the order of one micron disposed in the perimetral region around the core and within the casing, said mat being held substantially uniformly compacted directly against the flanks of the core including the spacers thereof at all points, said casing comprising frame members secured together and forming a rectangular casing adapted to be assembled about said core and mat, and said frame members each having forward and rearward rigidifying flanges forming rigid rectangular frames along the front and rear marginal edges of said casing, whereby to apply uniform compacting pressure upon said mat overlying said core.

3. A filter for gases and the like comprising a rectangular core composed of a sheet of pleated filter material comprising mineral fibers of the order of one micron, and corrugated spacers interposed in the loops of said pleats, a rigid rectangular casing of noncombustible material surrounding said core and disposed in substantially uniform spaced relation around said core, and a mat of compacted mineral fiber filter material composed of fibers in the order of one micron disposed in the perimetral region around the core and within the casing, said mat being held compacted directly against the flanks of the core including the spacers thereof by said casing.

4. A filter for gases and the like comprising a rectangular core composed of a sheet of pleated filter material comprising noncombustible filter fibers of the order of one micron, and corrugated spacers interposed in the loops of said pleats, a rigid rectangular casing of noncombustible material surrounding said core and disposed in substantially uniform spaced relation around said core, and a mat of compacted mineral fiber filter material composed of fibers in the order of one micron disposed in the perimetral region around the core and within the casing, said mat being held compacted directly against the flanks of the core including the spacers thereof by said casing comprising frame members secured together and forming said rectangular casing and adapted to be assembled about said core and mat, whereby to apply uniform compacting pressure upon said mat overlying the flanks of said core.

5. A filter for gases and the like comprising a rectangular core composed of a sheet of pleated filter material comprising heat resistant mineral fibers of the order of one micron, and corrugated spacers interposed in the opposite folds of said pleats, a rigid rectangular sheet metal casing surrounding said core and disposed in substantially uniform spaced relation from said core, and a mat of compacted mineral fiber filter material composed of fibers in the order of one micron disposed in the perimetral region around the core and within the casing, said mat being held compacted directly against the flanks of the core including the spacers thereof and being compacted to a volume about one fourth of its normal uncompacted volume, said casing comprising frame members secured together and forming said rectangular casing and being adapted to be assembled about said core and mat, and said frame members each having forward and rearward rigidifying flanges forming rigid rectangular frames along the front and rear marginal edges of said casing, whereby to apply uniform compacting pressure upon said mat overlying said core.

References Cited in the file of this patent

UNITED STATES PATENTS

| | | |
|---|---|---|
| 1,049,789 | Williamson | Jan. 7, 1913 |
| 2,251,964 | Stackhouse | Aug. 12, 1941 |
| 2,405,293 | Dahlman | Aug. 6, 1946 |
| 2,629,459 | Hammond et al. | Feb. 24, 1953 |
| 2,681,155 | Graham | June 15, 1954 |
| 2,800,195 | Bub | July 23, 1957 |